C. L. McGREW.
AUTOMATIC SAFETY STEERING DEVICE.
APPLICATION FILED MAR. 26, 1915.

1,221,761. Patented Apr. 3, 1917.

WITNESS:
R. E. Hamilton

INVENTOR
C. L. McGrew
BY
Chas. W. Gerard
ATTORNEY

UNITED STATES PATENT OFFICE.

CHARLES L. McGREW, OF KANSAS CITY, MISSOURI.

AUTOMATIC SAFETY STEERING DEVICE.

1,221,761.  Specification of Letters Patent.  Patented Apr. 3, 1917.

Application filed March 26, 1915. Serial No. 17,239.

*To all whom it may concern:*

Be it known that I, CHARLES L. McGREW, a citizen of the United States, residing at Kansas City, in the county of Jackson and State of Missouri, have invented certain new and useful Improvements in Automatic Safety Steering Devices; and I do declare the following to be a full, clear, and exact description of the invention, such as will enable others skilled in the art to which it appertains to make and use the same.

The present invention relates to safety steering devices for use in connection with automobiles, and the object in view is to provide an improved and simplified construction of this character for compact arrangement in relation to the axle and steering knuckles of this class of vehicles. In carrying out the invention, a pair of oppositely movable and spring-connected members are used, the same being suitably carried by the axle and provided with appropriate connections to the rod joining the steering-knuckle arms.

Having the above-stated general object in view, the invention will now be described with reference to one form of embodiment of the same as illustrated by the accompanying drawing, after which those features believed to be novel will be pointed out and claimed.

In the drawing—

Figure 1:
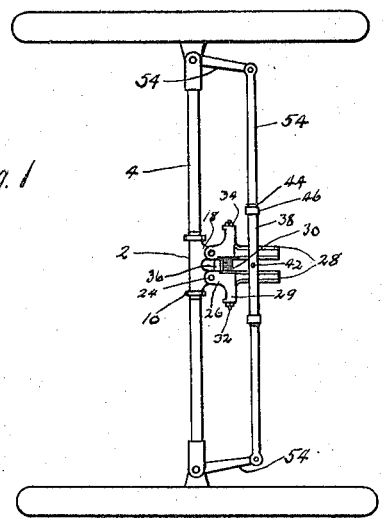
Figure 1 is a plan view of the front axle and steering knuckles of an automobile, with the present improvements applied thereto.
Figure 2:
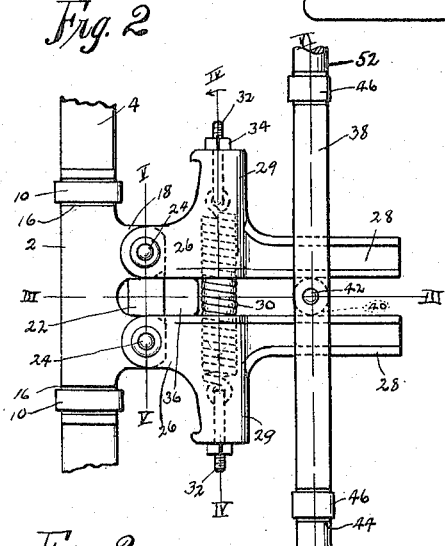
Fig. 2 is a plan view of only the middle portion of the view as shown in Fig. 1, but on a larger scale.
Figure 3:
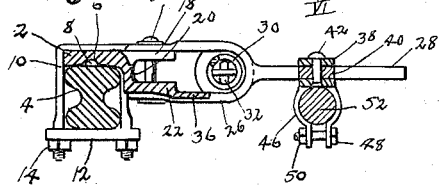
Figs. 3, 4, 5 and 6 are sectional views taken along the lines III—III, IV—IV, V—V, and VI—VI, respectively.
Figure 4:
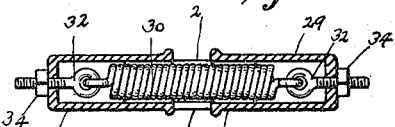
Figure 5:
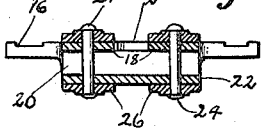
Figure 6:
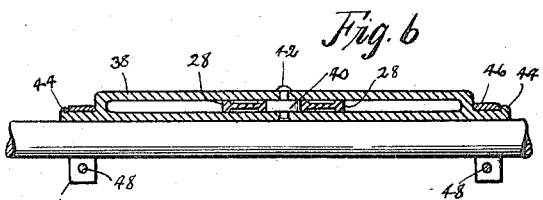

Referring to the drawing, the device is shown as comprising a bracket member 2, adapted to be secured to the front axle 4, said bracket being formed with suitable recesses or grooves 6 for receiving ribs 8 formed on the top face of the axle 4. Yoke clips 10, provided with the clamping plates 12 and nuts 14, are used for securing the bracket to the axle, said clips fitting in transverse grooves 16 at the opposite ends of the bracket. The bracket projects to the rear of the axle where it is formed with a pair of pivot lugs or ears 18, spaced apart as shown in Figs. 1, 2 and 5; and below these pivot ears the bracket is formed with a vertical or depending portion 20 adapted to shoulder against the rear side of the axle, and with a horizontal portion 22 extending parallel and in spaced relation to the ears 18 (see Fig. 3). Each of the pivot lugs or ears 18 is provided with a bolt 24, the lower end of which is carried by the underlying horizontal portion 22 of the bracket, and on the outer ends of these bolts 24 are pivotally mounted the forked portions 26 of a pair of levers 28. These forked portions of the levers 28 are formed with outwardly extending housings 29, and within said forked portions and housings is accommodated a strong helical spring 30 provided with eye-bolts 32 at its opposite ends, the shanks of said bolts passing through the outer walls of the housings 29 where they are held by the nuts 34. The spring 30 tends to hold the levers 28 with their lower forked portions 26 normally in engagement with a stop lug 36 which projects rearwardly from the horizontal ledge 22 of the bracket 2.

Embracing the rear ends of the arms of the levers 28 is a yoke member 38, within which is journaled a roller 40 on a pin 42 carried by the said yoke, said roller being of a diameter equal to the distance between the levers 28 when they are in normal position, so that in such position both levers will be in engagement with said roller. The yoke member 38 is of such length as to provide ample clearance for either of the lever arms when the other arm is being engaged and moved by the roller. At its ends the yoke is provided with short extensions 44 for receiving the yoke clips 46 whereby the yoke member 38 may be clamped, by means of bolts 48 and nuts 50, to the usual tie or distance rod 52 which connects the steering-knuckle arms 54.

It will be apparent from the foregoing that a simple and effective device is thus provided for carrying out the object of the invention. The operation of the mechanism is of course obvious, the spring 30 tending, through the described connections, to maintain the steering mechanism in a constant relation in which the levers 28 are shouldered against the stop lug 36. The said spring yields the required amount whenever pulled one way or the other through the action of the tie or distance rod 52 in responding to the resistance due to obstacles or unevennesses met with in the road-bed;

but the spring thereafter immediately returns the parts to their normal relation, so that the action is entirely automatic and all undue shock or strain is taken off the steering mechanism. The arrangement of the device is simple, compact, and of neat appearance, and the spring element is housed practically out of view as well as protected by being mounted in the manner shown. Another important advantage of this mode of mounting the spring resides in the fact that it is enabled to clear itself of mud or other impurities on account of the housing being open on one of its sides, so that the spring can not clog, nor freeze solid, as would be the case if it were inclosed all around. Access may also be readily had to the spring for the purpose of removing or adjusting it without removing the rest of the device from the car. The location of the spring element intermediate the bracket and the tie rod also makes possible the use of a stronger and more durable spring than otherwise, since this location of the spring together with the manner of connecting it with the levers provides a structure in which relatively slight extension is required of the spring for even the sharp turning movements of the car in rounding corners. Adjustment of the spring's tension is readily made by means of the nuts 34.

While the invention has been described and illustrated by means of what is now deemed to be the preferred form of embodiment of the same, the right is reserved to such formal changes and modifications as may fairly fall within the scope of the appended claims.

Claims:

1. In a safety steering device, the combination with the axle and steering rod, of a bracket secured to the axle and provided with a stop and with pivot lugs projecting toward said rod, a pair of levers having forked portions pivotally connected to said pivot lugs, a spring inclosed within the forked portions of said levers and acting to hold said levers normally in engagement with said stop, and means providing a floating connection between the free ends of said levers and said steering rod.

2. In a safety steering device, the combination with the axle and steering rod, of a bracket provided with a stop and secured to the axle, a pair of levers each pivoted at one end to the said bracket and provided with housing portions intermediate said bracket and rod, means providing a floating connection between the free ends of said levers and said rod, and an extension spring inclosed within the housing portions of said levers and connected thereto for holding the levers in yielding engagement with said stop.

3. A safety steering device comprising, in combination, a bracket provided with vertically spaced pivot lugs projecting horizontally therefrom, a pair of levers having forked portions pivotally connected to said pivot lugs, a stop lug carried by said bracket and projecting between said levers, a spring inclosed within the forked portions of said levers and acting to hold their lower forked portions normally in engagement with said stop lug, and a yoke member having rolling engagement with the free ends of said levers.

4. In a safety steering device, the combination with the axle and steering rod, of a bracket mounted upon the axle and provided with vertically spaced pivot lugs projecting toward said rod, a pair of levers having forked portions pivotally connected to said pivot lugs, a stop lug extending in downwardly offset relation from the lower of said pivot lugs and projecting in between the lower forked portions of said levers, a spring connecting said levers and housed within the forked portions thereof, said spring acting to hold the lower forked portions of the levers normally in engagement with said stop lug, and means providing a floating connection between the free ends of said levers and said steering rod.

CHARLES L. McGREW.

Copies of this patent may be obtained for five cents each, by addressing the "Commissioner of Patents, Washington, D. C."